(12) United States Patent
Wang et al.

(10) Patent No.: US 12,216,220 B2
(45) Date of Patent: Feb. 4, 2025

(54) METHOD AND APPARATUS FOR MEASURING ANGLE OF ARRIVAL

(71) Applicant: HUAWEI TECHNOLOGIES CO., LTD., Shenzhen (CN)

(72) Inventors: Ben Wang, Beijing (CN); Dejian Li, Beijing (CN)

(73) Assignee: SHENZHEN YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 335 days.

(21) Appl. No.: 17/848,652

(22) Filed: Jun. 24, 2022

(65) Prior Publication Data

US 2022/0342025 A1 Oct. 27, 2022

Related U.S. Application Data

(63) Continuation of application No. PCT/CN2019/128614, filed on Dec. 26, 2019.

(51) Int. Cl.
*G01S 3/14* (2006.01)

(52) U.S. Cl.
CPC ...................... *G01S 3/14* (2013.01)

(58) Field of Classification Search
CPC .......................................... G01S 3/14
USPC ...................................... 342/372
See application file for complete search history.

(56) References Cited

U.S. PATENT DOCUMENTS

| 5,572,220 A | 11/1996 | Cai |
| 9,835,723 B2 | 12/2017 | Jansen et al. |
| 10,481,242 B2 * | 11/2019 | Ikram ............... G01S 19/235 |
| 2003/0063695 A1 | 4/2003 | Lee |
| 2009/0243933 A1 | 10/2009 | Shirakawa |
| 2016/0172767 A1 | 6/2016 | Ray |
| 2017/0256855 A1 * | 9/2017 | Robinson ............. H01Q 3/34 |

(Continued)

FOREIGN PATENT DOCUMENTS

| CN | 101349742 A | 1/2009 |
| CN | 105807252 A | 7/2016 |

(Continued)

OTHER PUBLICATIONS

Chen et al., "A method of DOA estimation by a special array structure", Journal of Shandong University (Engineering Science), Apr. 2007, vol. 37, No. 2, English abstract provided, 5 pages.

(Continued)

*Primary Examiner* — Harry K Liu
(74) *Attorney, Agent, or Firm* — Maier & Maier, PLLC

(57) ABSTRACT

A method and apparatus for measuring an angle of arrival. The method includes: determining L×N values based on received values obtained by a first antenna array and a second antenna array by receiving a signal and determining an angle of arrival (AoA) of the first signal based on the L×N values. The first antenna array includes L rows of array elements arranged in a first direction and K columns of array elements arranged in a second direction. The second antenna array includes P rows of array elements arranged in the first direction and Q columns of array elements arranged in the second direction. N=K+Q. An included angle between the first direction and the second direction is greater than 0 degrees.

18 Claims, 6 Drawing Sheets

200

S210: Receive a first signal by using an antenna array #1 and an antenna array #2

S220: Determine L×N values based on received values obtained by the antenna array #1 and the antenna array #2 by receiving the first signal S230: Determine an AoA of the first signal based on the L×N values

(56) References Cited

U.S. PATENT DOCUMENTS

| | | | |
|---|---|---|---|
| 2018/0191082 A1* | 7/2018 | Stoneback | ............ H01Q 21/22 |
| 2019/0115670 A1 | 4/2019 | Kishigami | |

FOREIGN PATENT DOCUMENTS

| | | | | |
|---|---|---|---|---|
| CN | 106019234 A | | 10/2016 | |
| CN | 106662637 A | | 5/2017 | |
| CN | 107728102 A | | 2/2018 | |
| CN | 108020812 A | | 5/2018 | |
| CN | 104937856 B | | 6/2018 | |
| CN | 108141256 A | * | 6/2018 | ............ H01Q 3/267 |
| CN | 108226871 A | | 6/2018 | |
| CN | 108471324 A | | 8/2018 | |
| CN | 108957391 A | | 12/2018 | |
| CN | 109444891 A | | 3/2019 | |
| CN | 109521426 A | | 3/2019 | |
| CN | 110073237 A | | 7/2019 | |
| CN | 110286376 A | | 9/2019 | |
| EP | 2423704 A1 | | 2/2012 | |
| EP | 3588797 B1 | * | 11/2021 | ........... H04B 7/0413 |
| JP | 2019090749 A | | 6/2019 | |
| KR | 1020190007221 A | | 1/2019 | |
| WO | 2016045938 A1 | | 3/2016 | |
| WO | 2018142396 A1 | | 8/2018 | |

OTHER PUBLICATIONS

Chuang et al., "High-Resolution AoA Estimation for Hybrid Antenna Arrays", IEEE Transactions on Antennas and Propagation, Jul. 2015, vol. 63, No. 7, 14 pages.

Tan et al., "UWB-AOA Estimation Method Based on a Spare Antenna Array with Virtual Element", 2018 IEEE International Conference on Computational Electromagnetics (ICCEM), Mar. 26, 2018, 3 pages.

* cited by examiner

METHOD AND APPARATUS FOR MEASURING ANGLE OF ARRIVAL

CROSS-REFERENCE TO RELATED APPLICATIONS

This application is a continuation of International Application No. PCT/CN2019/128614, filed on Dec. 26, 2019, the disclosure of which is hereby incorporated by reference in its entirety.

TECHNICAL FIELD

The embodiments relate to the communication field, and a method and apparatus for measuring an angle of arrival.

BACKGROUND

A millimeter-wave radar is one of indispensable sensors in the field of autonomous driving because of an all-weather detection capability. With continuous development of autonomous driving technologies, higher requirements are imposed on detection performance of the millimeter-wave radar. To obtain a high-definition point cloud imaging capability, the millimeter-wave radar is required to have a capability of detecting horizontal and vertical 2-dimensional (2D) angular information of a target, and a sufficiently high angular resolution. To obtain a sufficiently high angular resolution, a large-aperture antenna array needs to be used. However, due to restrictions of costs, processing techniques, and installation positions, a quantity of antennas that can be placed on the millimeter-wave radar is limited, and a sufficient antenna array aperture cannot be provided. To obtain a larger antenna array aperture when the quantity of antennas is limited, antennas usually need to be sparsely placed. However, the sparsely placed antennas decrease a field of view (FOV) of an array, and due to angle ambiguity on a spatial spectrum, angle of arrival (AoA) measurement is not precise enough. Therefore, how to obtain a precise AoA when a quantity of antennas of a millimeter-wave radar is limited becomes an urgent problem to be resolved in this field.

SUMMARY

The embodiments provide a method and apparatus for measuring an angle of arrival, which can resolve a problem of angle ambiguity occurring when an AoA of a received signal is measured, estimate the AoA of the received signal, and effectively expand a field of view of an antenna array.

According to the first aspect, a method for measuring an AoA is provided. The method includes: receiving a first signal by using a first antenna array and a second antenna array; determining L×N values based on received values obtained by the first antenna array and the second antenna array by receiving the first signal, where the first antenna array includes L rows of array elements arranged in a first direction and K columns of array elements arranged in a second direction, and the second antenna array includes P rows of array elements arranged in the first direction and Q columns of array elements arranged in the second direction; N=K+Q, P<L, L, K, P, and Q are all positive integers, and a location of any column of the Q columns of array elements in the second antenna array in the second direction is different from a location of each column of the K columns of array elements in the first antenna array in the second direction; the L×N values include received values obtained by each array element in the first antenna array by receiving the first signal, and values determined based on received values obtained by the Q columns of array elements in the second antenna array by receiving the first signal; and an included angle greater than 0 degrees exists between the first direction and the second direction; and determining an AoA of the first signal based on the L×N values.

The first signal may be a reflected signal obtained after a detection signal sent by a communication device for performing the method is reflected by a detection target, or the first signal may be a signal sent by the detection target. The communication device determines an orientation of the detection target by using the AoA of the first signal obtained through measurement.

According to the foregoing solution, for the sparsely arranged first antenna array, the second antenna array is additionally disposed, where a quantity of rows of array elements arranged in the first direction is less than a quantity of rows of array elements of the first antenna array, and an array element location is different from an array element location of the first antenna array in the second direction. The antenna array #1 and the antenna array #2 jointly receive a signal, to add sampling values of the received signal in the second direction. This can resolve a problem of angle ambiguity occurring when an AoA of a received signal is measured, estimate the AoA of the received signal, and effectively expand a field of view of an antenna array. In addition, dense arrangement of each row of array elements in the first antenna array is avoided, and engineering implementation is easy. Especially, a large-scale antenna array can reduce material overheads and costs of array elements on the basis of resolving a problem of angle ambiguity of an AoA.

With reference to the first aspect, in some implementations of the first aspect, the L×N values are divided into L groups of values, each group of values includes N elements, N elements in an $l^{th}$ group of values include K received values obtained by an $l^{th}$ row of array elements in the first antenna array by receiving the first signal, and Q values determined based on the received values obtained by the Q columns of array elements in the second antenna array by receiving the first signal, an arrangement order of the N elements is the same as an arrangement order of the K columns of array elements in the first antenna array and the Q columns of array elements in the second antenna array in the second direction, and l is any integer from 1 to L.

According to the foregoing solution, each group of the L groups of values includes values determined based on Q columns of values in the second antenna array, so that sampling values of the first signal in the second direction are added, accuracy of AoA estimation is improved, and a problem of angle ambiguity can be resolved. In addition, received values or values determined based on the received values are arranged in an arrangement order of a receiving column of array elements, namely, an ascending or descending order of phase shifts of the received signal, which facilitates signal processing and AoA estimation.

With reference to the first aspect, in some implementations of the first aspect, the method further includes: generating, based on the L×N values, a matrix whose dimension is L×N, where one row of elements in the matrix is a group of values in the L groups of values; and the determining an AoA of the first signal based on the L×N values includes: determining the AoA based on the matrix.

According to the foregoing solution, a manner of generating the matrix based on the L×N values facilitates subsequent signal processing and AoA estimation.

With reference to the first aspect, in some implementations of the first aspect, the method further includes: generating, based on the L×N values, a first vector whose length is L×N, where the L groups of values in the first vector are sequentially arranged; and the determining an AoA of the first signal based on the L×N received values includes: determining the AoA based on the first vector.

According to the foregoing solution, the AoA is determined based on all the sampling values in the second direction, namely, the vectors generated based on the received values, so that accuracy of AoA estimation can be improved.

With reference to the first aspect, in some implementations of the first aspect, the Q values included in the $l^{th}$ group of values are Q received values received by a predefined row of array elements in the Q columns of array elements.

With reference to the first aspect, in some implementations of the first aspect, Q values that are included in each of at least two groups of values in the L groups of values and that are determined based on the received values of the Q columns of array elements are Q received values received by different rows of array elements in the Q columns of array elements, respectively.

With reference to the first aspect, in some implementations of the first aspect, the Q values included in any group of the L groups of values are Q values obtained by performing a mean operation on received values of each column of the Q columns of array elements.

With reference to the first aspect, in some implementations of the first aspect, the determining an AoA of the first signal based on the L×N values includes: generating, based on the L×N values, a second vector whose length is 1×N; and determining the AoA based on the second vector, where the second vector includes K values obtained by summating received values of each column of array elements in the first antenna array, and the second vector further includes: Q values obtained by summating L values determined based on one or more of P received values received by each column of the Q columns of array elements, or Q values determined based on a multiple of a mean value of P received values received by each column of the Q columns of array elements, where the multiple equals the mean value multiplied by L.

According to the foregoing solution, after received values of a same column of array elements are added or values determined based on the received values of the same column of array elements are added, the second vector is generated to determine the AoA. This increases a gain of sampling values in a same location in the second direction and can improve accuracy of AoA estimation.

With reference to the first aspect, in some implementations of the first aspect, the AoA is obtained through FFT or DBF based on the L×N values.

According to the foregoing solution, an estimated AoA of the first signal can be quickly and accurately obtained through FFT or DBF.

With reference to the first aspect, in some implementations of the first aspect, the first antenna array or the second antenna array or both are virtual antenna arrays.

According to the foregoing solution, a virtual antenna array is formed. This can further reduce material overheads of array elements and costs on the basis of resolving the problem of angle ambiguity of the AoA.

With reference to the first aspect, in some implementations of the first aspect, the AoA includes an included angle between a direction of arrival of the first signal and the second direction.

According to the second aspect, an apparatus for measuring an AoA is provided. The apparatus: a transceiver unit, configured to receive a first signal by using a first antenna array and a second antenna array; and a processing unit, configured to determine L×N values based on received values obtained by the first antenna array and the second antenna array by receiving the first signal, where the first antenna array includes L rows of array elements arranged in a first direction and K columns of array elements arranged in a second direction, and the second antenna array includes P rows of array elements arranged in the first direction and Q columns of array elements arranged in the second direction. N=K+Q, P<L, L, K, P, and Q are all positive integers, and a location of any column of the Q columns of array elements in the second antenna array in the second direction is different from a location of each column of the K columns of array elements in the first antenna array in the second direction The L×N values include received values obtained by each array element in the first antenna array by receiving the first signal, and values determined based on received values obtained by the Q columns of array elements in the second antenna array by receiving the first signal. An included angle greater than 0 degrees exists between the first direction and the second direction. The processing unit is further configured to determine an AoA of the first signal based on the L×N values.

With reference to the second aspect, in some implementations of the second aspect, the L×N values are divided into L groups of values, each group of values includes N elements, N elements in an $l^{th}$ group of values include K received values obtained by an $l^{th}$ row of array elements in the first antenna array by receiving the first signal, and Q values determined based on the received values obtained by the Q columns of array elements in the second antenna array by receiving the first signal, an arrangement order of the N elements is the same as an arrangement order of the K columns of array elements in the first antenna array and the Q columns of array elements in the second antenna array in the second direction, and l is any integer from 1 to L.

With reference to the second aspect, in some implementations of the second aspect, the processing unit is further configured to generate, based on the L×N values, a matrix whose dimension is L×N, where one row of elements in the matrix is a group of values in the L groups of values; and the processing unit is further configured to determine an AoA of the first signal based on the L×N values, and the processing unit may be further configured to determine the AoA based on the matrix.

With reference to the second aspect, in some implementations of the second aspect, the processing unit is further configured to generate, based on the L×N values, a first vector whose length is L×N, where the L groups of values in the first vector are sequentially arranged. The processing unit is further configured to determine an AoA of the first signal based on the L×N received values. The processing unit may be further configured to determine the AoA based on the first vector.

With reference to the second aspect, in some implementations of the second aspect, the Q values included in the $l^{th}$ group of values are Q received values received by a predefined row of array elements in the Q columns of array elements.

With reference to the second aspect, in some implementations of the second aspect, Q values that are included in each of at least two groups of values in the L groups of values and that are determined based on the received values of the Q columns of array elements are Q received values received by different rows of array elements in the Q columns of array elements, respectively.

With reference to the second aspect, in some implementations of the second aspect, the Q values included in any group of the L groups of values are Q values obtained by performing a mean operation on received values of each column of the Q columns of array elements.

With reference to the second aspect, in some implementations of the second aspect, the processing unit is further configured to determine an AoA of the first signal based on the L×N values. The processing unit may be further configured to generate, based on the L×N values, a second vector whose length is 1×N. The processing unit is further configured to determine the AoA based on the second vector, where the second vector includes K values obtained by summating received values of each column of array elements in the first antenna array, and the second vector further includes: Q values obtained by summating L values determined based on one or more of P received values received by each column of the Q columns of array elements, or Q values determined based on a multiple of a mean value of P received values received by each column of the Q columns of array elements, where the multiple equals the mean value multiplied by L.

With reference to the second aspect, in some implementations of the second aspect, the AoA is obtained through FFT or DBF based on the L×N values.

With reference to the second aspect, in some implementations of the second aspect, the first antenna array or the second antenna array or both are virtual antenna arrays.

With reference to the second aspect, in some implementations of the second aspect, the AoA includes an included angle between a direction of arrival of the first signal and the second direction.

According to a third aspect, a communication apparatus is provided, including a processor. The processor is coupled to a memory and may be configured to execute instructions in the memory, to implement the foregoing method according to any one of the first aspect and the possible implementations of the first aspect. Optionally, the communication apparatus further includes the memory. Optionally, the communication apparatus further includes a communication interface, and the processor is coupled to the communication interface.

In an implementation, the communication apparatus is a communication device. When the communication apparatus is the communication device, the communication interface may be a transceiver or an input/output interface.

In another implementation, the communication apparatus is a chip configured in the communication device. When the communication apparatus is the chip configured in the communication device, the communication interface may be an input/output interface.

Optionally, the transceiver may be a transceiver circuit. Optionally, the input/output interface may be an input/output circuit.

According to a fourth aspect, a processor is provided, including an input circuit, an output circuit, and a processing circuit. The processing circuit is configured to receive a signal by using the input circuit, and transmit a signal by using the output circuit, to enable the processor to perform the method according to any one of the first aspect and the possible implementations of the first aspect.

In an implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Implementations of the processor and the various circuits are not limited in the embodiments.

According to a fifth aspect, a processing apparatus is provided, including a processor and a memory. The processor is configured to read instructions stored in the memory, and may receive a signal by using a receiver, and transmit a signal by using a transmitter, to perform the method according to any one of the first aspect and the possible implementations of the first aspect.

Optionally, there are one or more processors, and there are one or more memories.

Optionally, the memory may be integrated with the processor, or the memory and the processor are disposed separately.

In an implementation process, the memory may be a non-transitory memory, for example, a read-only memory (ROM). The memory and the processor may be integrated into one chip or may be disposed in different chips. A type of the memory and a manner in which the memory and the processor are disposed are not limited in this embodiment.

It should be understood that a related data exchange process, for example, sending indication information, may be a process of outputting the indication information from the processor, and receiving capability information may be a process of receiving the input capability information by the processor. Data output by the processor may be output to the transmitter, and input data received by the processor may be from the receiver. The transmitter and the receiver may be collectively referred to as a transceiver.

The processing apparatus in the fifth aspect may be one or more chips. The processor in the processing apparatus may be implemented by using hardware or may be implemented by using software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor or may be located outside the processor and exist independently.

According to a sixth aspect, a computer program product is provided. The computer program product includes a computer program (which may also be referred to as code or instructions). When the computer program is run, a computer is enabled to perform the foregoing method according to any one of the first aspect and the possible implementations of the first aspect.

According to a seventh aspect, a computer-readable medium is provided. The computer-readable medium stores a computer program (which may also be referred to as code or instructions). When the computer program is run on a computer, the computer is enabled to perform the foregoing method according to any one of the first aspect and the possible implementations of the first aspect.

DETAILED DESCRIPTION OF THE EMBODIMENTS

The following describes the embodiments with reference to the accompanying drawings.

The embodiments may be applied to various communication systems, for example, a radar detection system, a long term evolution (LTE) system, an LTE frequency division duplex (FDD) system, and an LTE time division duplex (TDD) system, a universal mobile telecommunication system (UMTS), a future 5th generation (5G) system, a new radio (NR), or a wireless local area network (WLAN) system, and may be further applied to a vehicle-to-everything (V2X), where the V2X may include vehicle to network (V2N), vehicle to vehicle (V2V), vehicle to infrastructure (V2I), vehicle to pedestrian (V2P), and the like, a workshop communication long term evolution technology (LTE-V), the Internet of Vehicles, machine-type communication (MTC), the Internet of Things (IoT), a machine-to-machine communication long term evolution technology (LTE-M), a machine-to-machine (M2M), and the like.

Figure 1:
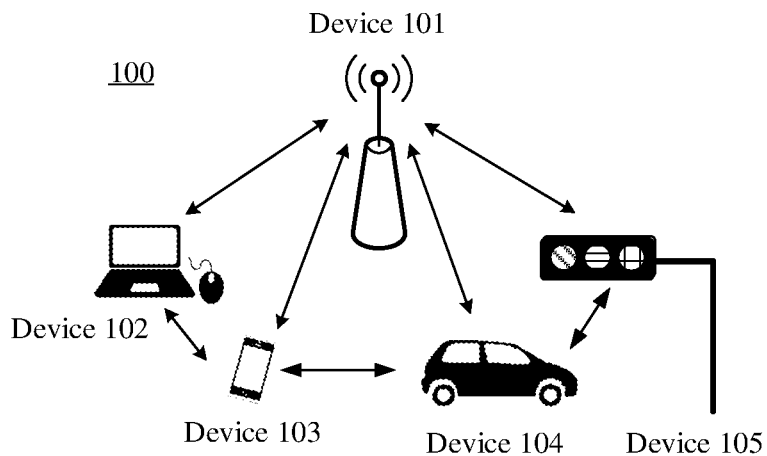
FIG. 1 is a schematic diagram of an example of a communication system.

The embodiments may be applied to any device having a wireless communication function. For example, in the wireless communication system shown in FIG. 1, the embodiments may be applied to a network device 101 that provides a network service for another device, or may be applied to a terminal device, for example, any one of the devices 102 to 105 shown in FIG. 1. A device to which this solution is applied may measure an angle of arrival (AoA) of a signal according to a method provided in this solution and estimate an orientation of another device or an obstacle.

The embodiments may be applied to a terminal device. The terminal device may be a radar, a mobile phone, a tablet computer (pad), a computer with a wireless transceiver function, a virtual reality (VR) terminal device, or an augmented reality (AR) terminal device, a wireless terminal in industrial control, a wireless terminal in self driving, a wireless terminal in transportation safety, a wireless terminal in smart city, a wireless terminal in smart home, a cellular phone, a cordless phone, a session initiation protocol (SIP) phone, a wireless local loop (WLL) station, a personal digital assistant (PDA), a handheld device with a wireless communication function, a computing device, or another processing device connected to a wireless modem, or a vehicle-mounted device, a wearable device, a terminal device in a 5G network or a terminal device in a future evolved public land mobile network (PLMN), a terminal device in a WLAN, or the like.

The wearable device may also be referred to as a wearable intelligent device and is a general term of wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not merely a hardware device but is used to implement a powerful function through software support, data exchange, and cloud interaction. Generalized wearable intelligent devices include full-featured and large-size devices, such as smart watches or smart glasses, that can implement complete or partial functions without depending on smartphones, and devices, such as various smart bands, or smart jewelry for monitoring physical signs, that focus on only one type of application functions and need to work with other devices such as smartphones.

In addition, the terminal device may alternatively be a terminal device in an Internet of Things (IoT) system. The IoT is an important part of future information technology development. A main feature of the IoT is to connect things to a network by using a communication technology, to implement an intelligent network for human-machine interconnection and thing-thing interconnection.

It should be understood that a form of the terminal device is not limited.

The embodiments may be further applied to a network device. The network device includes but is not limited to an evolved NodeB (eNB), a radio network controller (RNC), a NodeB (NB), a base station controller (BSC), a base transceiver station (BTS), a home node B (HNB), a baseband unit (BBU), an access point (AP) in a wireless fidelity (Wi-Fi) system, a wireless relay node, a wireless backhaul node, a transmission point (TP), a transmission and reception point (TRP), or the like. Alternatively, the network device may be a gNB or a transmission point (TP) in a 5G (for example, NR) system, may be one antenna panel or a group (including a plurality of antenna panels) of antenna panels of a base station in a 5G system, or may be a network node, such as a baseband unit (BBU) or a distributed unit (DU), that constitutes a gNB or a transmission point.

To facilitate understanding of the embodiments, terms used in the embodiments are first briefly described.

The antenna array is an antenna set in which at least two antenna units are arranged (which may also be referred to as organized or distributed) regularly or randomly, where each antenna unit may be used to receive a signal, and the antenna unit may also be referred to as an array element. The antenna array may be an antenna set including physical antennas, or may be a virtual array, namely, a virtual antenna array obtained by extending an original array aperture or increasing a quantity of array elements (for example, constructing an array structure model, processing a received signal source by using a mathematical method, or performing virtual transformation on an array).

It should be further noted that, to facilitate understanding of the method provided in the embodiments, the following schematically provides a plurality of examples of a first antenna array and a second antenna array by using a plurality of accompanying drawings. For ease of description, an antenna array #1 in the figure is an example of the first antenna array, and an antenna array #2 in the figure is an example of the second antenna array. A direction y in the figure is an example of a first direction, and a direction x in the figure is an example of a second direction. It should be understood that the antenna array #1 and the antenna array #2 shown in a plurality of accompanying drawings in the following are merely examples for ease of understanding and shall not constitute any limitation.

The following describes in detail the method for measuring an AoA provided in the embodiments with reference to the accompanying drawings.

A method may measure an angle of arrival of a same signal based on received values of the signal of two antenna arrays whose array arrangements are different. This can resolve a problem of angle ambiguity of an AoA of a signal, and effectively expand a field of view of an antenna array.

Figure 2:
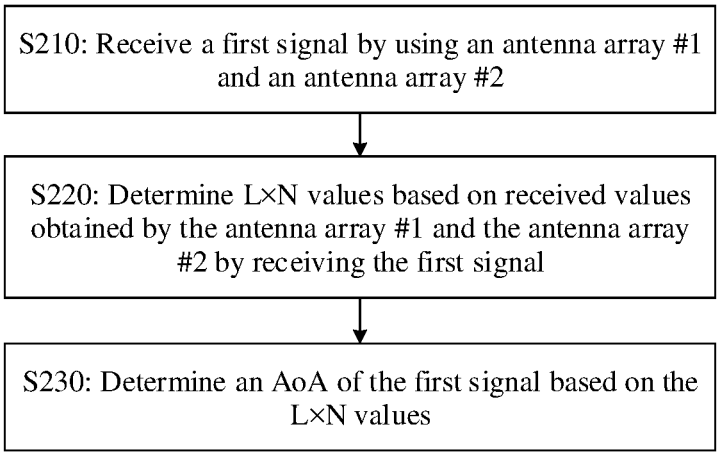
FIG. 2 is a flowchart of an example of a method for measuring an angle of arrival according to an embodiment.

FIG. 2 is a flowchart of an example of a method for measuring an AoA according to an embodiment. The method 200 shown in FIG. 2 may be performed by any communication device having a wireless communication function or may be performed by a component (such as a chip or a chip system) configured in the communication device. For ease of understanding and description only, an example in which the communication device performs the measurement method provided in the embodiments is used below for description. However, this shall not constitute any limitation.

The method 200 shown in FIG. 2 may include S210 to S230. The following describes in detail the steps in the method 200.

S210: A communication device receives a first signal by using an antenna array #1 (an example of a first antenna array) and an antenna array #2 (an example of a second antenna array).

Figure 3:
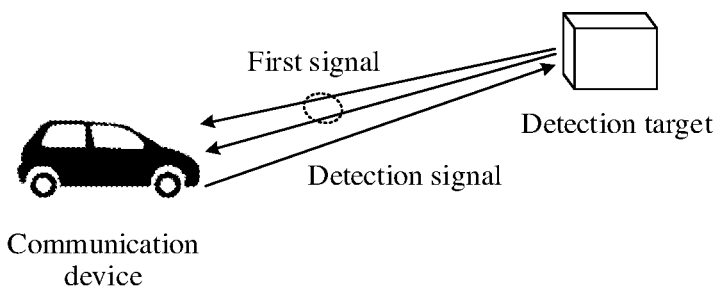
FIG. 3 is a schematic diagram of an example of a method for measuring an angle of arrival according to an embodiment.

In an implementation, the communication device may determine an azimuth of a detection target by using an AoA of a detection signal reflected by the detection target. In other words, the first signal may be a reflected signal that is of the detection signal sent by the communication device and that is reflected by the detection target. For example, as shown in FIG. 3, after sending the detection signal, the communication device receives the reflected signal that is of the detection signal and that is reflected by the detection target, namely, the first signal, and determines an orientation of the detection target by measuring the AoA of the first signal. The first signal may include a plurality of signals reflected by the detection target.

In another implementation, the first signal may be a signal sent by another device. After receiving the first signal sent by the another device, the communication device determines an angle of arrival of the first signal, and then determines, based on the angle of arrival of the first signal, an orientation of the another device that sends the first signal.

Figure 4:
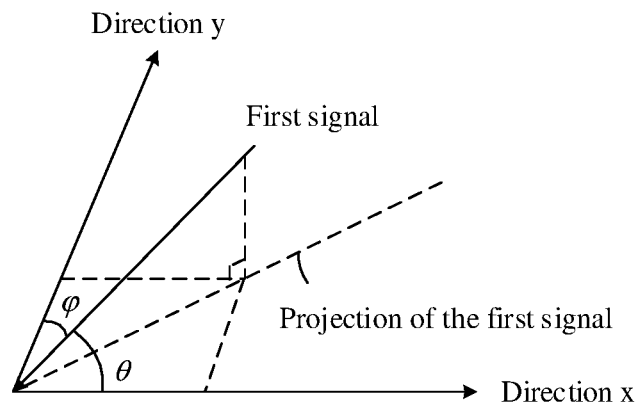
FIG. 4 is a schematic diagram of an angle of arrival of a first signal according to an embodiment.

The AoA may also be referred to as an angle of arrival or a direction of arrival of the first signal. The AoA may include two components: θ and φ, and may be denoted as AoA (θ, φ). For ease of understanding, the AoA is first briefly described herein with reference to FIG. 4. FIG. 4 is a schematic diagram of the AoA of the first signal. As shown in FIG. 4, θ is an included angle between a direction of arrival of the first signal and the direction x, and φ is an included angle between a direction of arrival of the first signal and the direction y. In other words, the direction of arrival of the first signal is AoA (θ, φ).

The antenna array #1 may include L×K array elements. The L×K array elements are arranged into L rows of array elements in the direction y (that is, an example of the first direction), and each row includes K array elements arranged in the direction x (that is, an example of the second direction). In other words, the L×K array elements are arranged into K columns of array elements in the direction x, and each column includes L array elements arranged in the direction y. The antenna array #2 includes P×Q array elements. The P×Q array elements are arranged into P rows of array elements in the direction y, and each row includes Q array elements arranged in the direction x. In other words, the P×Q array elements are arranged into Q columns of array elements in the direction x, and each column includes P array elements arranged in the direction y. A location of any column of the Q columns of array elements in the antenna array #2 in the direction x does not coincide with a location of each column of the K columns of array elements in the antenna array #1 in the direction x. The direction x and the direction y have an included angle greater than 0 degrees.

Figure 5:
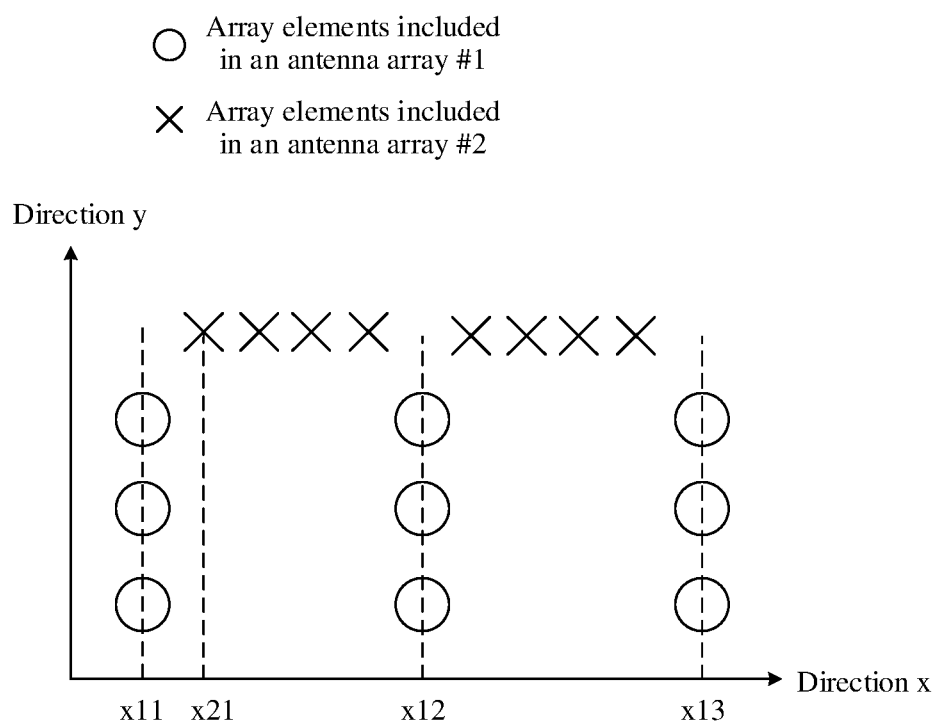
FIG. 5 is a schematic diagram of an example of an antenna array according to an embodiment.

FIG. 5 shows an example of the antenna array #1 and the antenna array #2. As shown in the figure, the antenna array #1 includes array elements arranged in three rows in the direction x and three columns in the direction y, each column includes three array elements, and the antenna array #1 includes nine array elements in the three rows and the three columns. The antenna array #2 includes array elements arranged in one row in the direction y and eight columns in the direction x, each column includes one array element, and the antenna array #2 includes eight array elements in one row and eight columns. Locations of the three columns of array elements in the antenna array #1 in the direction x are x11, x12, and x13. A location of any column of the eight columns of array elements in the antenna array #2 in the direction x does not coincide with x11, x12, or x13. For example, a location x21 of the first column of array elements in the direction x does not coincide with x11, x12, or x13.

Figure 6:
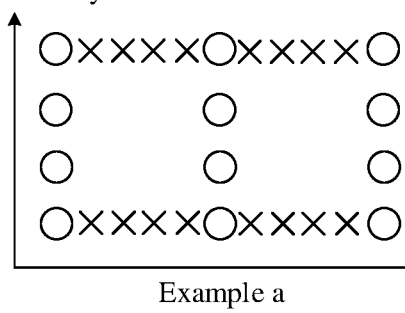
FIG. 6 is a schematic diagram of another example of an antenna array according to an embodiment.
Figure 6:
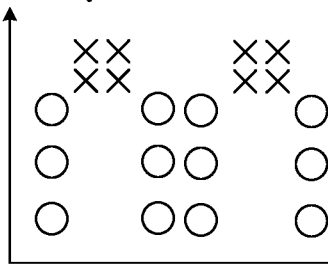
Figure 6:
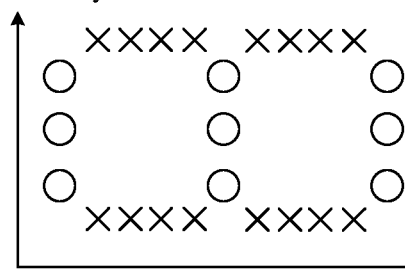

It should be noted that FIG. 5 is merely an example. The array elements in the antenna array #1 and the antenna array #2 are array elements used when the AoA of the first signal is measured. The antenna array #1 or the antenna array #2 may be a complete antenna array or may be a subarray of a complete antenna array. The antenna array #1 and the antenna array #2 may alternatively be two subarrays of a same antenna array. This is not limited. For example, FIG. 6 shows a possible arrangement of the antenna array #1 and the antenna array #2. The antenna array #1 and the antenna array #2 may be two subarrays of a same antenna array. The antenna array shown in example a in FIG. 6 includes array elements arranged in four rows in the direction y and eleven columns in the direction x. The first row of array elements and the fourth row of array elements each include eleven array elements, and the second row of array elements and the third row of array elements each include three array elements. In the antenna array, array elements in the first column, the sixth column, and the eleventh column form the antenna array #1, and other columns of array elements form the antenna array #2. In other words, the antenna array #1 and the antenna array #2 are two subarrays of the antenna array. Rows of the antenna array #2 may be all arranged on a same side of the antenna array #1 in the direction y, as shown in example b in FIG. 6. The antenna array #2 may alternatively be arranged on two sides of the antenna array #1 in the direction y, as shown in example c in FIG. 6.

The antenna array #1 and the antenna array #2 may be controlled by a same apparatus in the communication device to receive the first signal, or the antenna array #1 and the antenna array #2 may each be controlled by a different apparatus in the communication device to simultaneously receive the first signal. The method may be used for measuring an AoA of a continuous signal or may be used for measuring an AoA of a single signal. For example, the AoA of the first signal may be measured based on received values obtained by the antenna array #1 and the antenna array #2 by receiving the first signal at a same moment. The method is applicable to measuring the AoA of the continuous signal at each moment.

The communication device may obtain L×K received values and P×Q received values by using the antenna array #1 and the antenna array #2 to receive the first signal, where each received value is obtained by one array element by receiving the first signal, L×K received values correspond to L×K array elements in the antenna array #1 one by one, P×Q received values correspond to P×Q array elements in the antenna array #1 one by one, and each received value corresponds to an array element receiving the received value. The received value received by each array element may include a sum obtained when signals reflected by one or more detection targets in the first signal arrive at the receive array element. The communication device may divide the L×K received values received by the antenna array #1 into L groups of received values. Each group of received values includes K received values received by a same row of array elements. In addition, an arrangement order of the K received values in each group of received values is the same as an arrangement order of the corresponding array elements in the direction x. In other words, the received value $a_{lk}$ received by the array element in the $l^{th}$ row and the $k^{th}$ column in the antenna array #1 is the $k^{th}$ received value in the $l^{th}$ group of values in the L×K received values, where $0<l\leq L$, $0<k\leq K$, and l and k are integers.

The communication device divides the P×Q received values received by the antenna array #2 into P groups of received values. Each group of received values includes Q received values received by a same row of array elements. In addition, an arrangement order of the Q received values in each group of received values is the same as an arrangement order of the corresponding array elements in the direction x. In other words, the received value $b_{pq}$ received by the array element in the $p^{th}$ row and the $q^{th}$ column in the antenna array #2 is the $q^{th}$ received value in the $p^{th}$ group of values in the P×Q received values, where $0<p\leq P$, $0<q\leq Q$, and p and q are integers.

S220: The communication device determines L×N values based on received values obtained by the antenna array #1 and the antenna array #2 by receiving the first signal.

In other words, the communication device determines the L×N values based on L×K received values obtained by the antenna array #1 by receiving the first signal and P×Q received values obtained by the antenna array #2 by receiving the first signal, where N=K+Q. The L×N values include L×K received values of the antenna array #1 and Q values determined based on the P×Q received values of the antenna array #2.

A manner in which the communication device determines the L×N values may include but is not limited to a plurality of manners listed below. The following describes in detail several possible implementations of determining the L×N values.

Manner 1

The antenna array #2 includes array elements in one row and Q columns, in other words, P=1. The L×N values may include the L×K received values received by the antenna array #1 and Q received values received by the antenna array #2.

The communication device may insert the Q received values received by the antenna array #2 into each group of received values of the antenna array #1 in an arrangement order of receive array elements in the direction x, to obtain L×N received values. Alternatively, the communication device may insert, in an arrangement order of receive array elements in the direction x, the Q received values received by the antenna array #2 into K received values received by each row of array elements in the antenna array #1, to obtain L×N received values.

In other words, the L×N values may be divided into L groups of values, and each group of values includes N elements. N elements in an th group of values include an $l^{th}$ group of K received values $a_{l1}$ to $a_{lK}$ in the L×K received values. In other words, the $l^{th}$ group of values in the L×N values includes K received values received by an $l^{th}$ row of array elements in the antenna array #1. Each group of values in the L×N values includes Q received values $b_{11}$ to $b_{1Q}$ received by the antenna array #2. In addition, an arrangement order of N elements (namely, K received values received by one row of array elements in the antenna array #1 and Q received values received by one row of array elements in the antenna array #2) included in each group of values is the same as an arrangement order of the receive array elements corresponding to each received value in the direction x.

For example, as shown in FIG. 5, the antenna array #1 receives nine received values $a_{11}$ to $a_{33}$, L=3, and K=3. The nine received values are divided into three groups. A first group of received values includes received values $a_{11}$, $a_{12}$, and $a_{13}$ that are received by a first row of array elements, a second group of received values includes received values $a_{21}$, $a_{22}$, and $a_{23}$ that are received by a second row of array elements, and a third group of received values includes received values $a_{31}$, $a_{32}$, and $a_{33}$ that are received by a third array element. The antenna array #2 receives eight received values $b_{11}$ to $b_{18}$, P=1, and Q=8. The communication device inserts, in the arrangement order of the receive array elements in the direction x, $b_{11}$ to $b_{18}$ into each group of received values received by the antenna array #1, to determine L×N values for measuring the AoA, in other words, 3×11, 33 values. The 33 values include 3 groups of values, and each group of values includes 11 elements. A first group of values includes the first group of received values $a_{11}$, $a_{12}$, and $a_{13}$ of the antenna array #1 and the Q received values $b_{11}$ to $b_{18}$ received by the antenna array #2. In addition, an arrangement order of $a_{11}$, $a_{12}$, $a_{13}$, and $b_{11}$ to $b_{18}$ is the same as an arrangement order of receive array elements corresponding to the received values in the direction x. For example, a projection of an array element receiving $a_{11}$ in the antenna array #1 in the direction x is x11, and a projection of an array element receiving $b_{11}$ in the antenna array #2 in the direction x is x21. Therefore, in the 11 values, $a_{11}$ is followed by $b_{11}$, and $b_{11}$ is followed by $b_{12}$, $b_{13}$, $b_{14}$, and $a_{12}$ sequentially. An arrangement order of the 11 values is $a_{11}$, $b_{11}$, $b_{12}$, $b_{13}$, $b_{14}$, $a_{12}$, $b_{15}$, $b_{16}$, $b_{17}$, $b_{18}$, and $a_{13}$ by analogy based on an arrangement order of corresponding receive array elements. Similarly, a second group of values in the 33 values includes the second group of received values $a_{21}$, $a_{22}$, and $a_{23}$ of the antenna array #1, and $b_{11}$ to $b_{18}$, and an arrangement order is the same as an arrangement order of receive array elements corresponding to the received values in the direction x. A third group of values in the 33 values includes the third group of received values $a_{31}$, $a_{32}$, and $a_{33}$ of the antenna array #1, and $b_{11}$ to $b_{18}$, and an arrangement order is the same as an arrangement order of receive array elements corresponding to the received values in the direction x. Therefore, the 33 values are determined.

In implementation, the communication device may generate, based on the received values of the antenna array #1, a matrix whose dimension is L×K, where each row of received values of K array elements are used as one row of elements in the matrix. In addition, an arrangement order of each row of K received values in the matrix is the same as an arrangement order of receive array elements corresponding to the received values in the direction x. A received value $a_{lk}$ in the $l^{th}$ row and the $k^{th}$ column in the matrix may be received by an array element in the $l^{th}$ row and the $k^{th}$ column in the antenna array #1. For example, a matrix A whose dimension is L×K is as follows:

$$A = \begin{bmatrix} a_{11} & \cdots & a_{1k} & \cdots & a_{1K} \\ \vdots & \ddots & & & \vdots \\ a_{l1} & & a_{lk} & & a_{lK} \\ \vdots & & & \ddots & \vdots \\ a_{L1} & \cdots & a_{Lk} & \cdots & a_{LK} \end{bmatrix}.$$

Similarly, the communication device may generate, based on the received values of the antenna array #2, a matrix B whose dimension is P×Q as follows:

$$B = \begin{bmatrix} b_{11} & \cdots & b_{1q} & \cdots & b_{1Q} \\ \vdots & \ddots & & & \vdots \\ b_{p1} & & b_{pk} & & b_{pQ} \\ \vdots & & & \ddots & \vdots \\ b_{P1} & \cdots & b_{Pq} & \cdots & b_{PQ} \end{bmatrix}.$$

The communication device determines the L×N values in Manner 1. In this case, the matrix B is a vector with one row and Q columns. The Q values in the matrix B are inserted into each row in the matrix A. In addition, an arrangement order of received values is the same as an arrangement order of receive array elements corresponding to the received values in the direction x. For example, the L×N values (namely, 33 values) determined based on the received values of the first signal received by the two antenna arrays shown in FIG. 5 may be represented by using a matrix C as follows:

$$C = \begin{bmatrix} a_{11} & b_{11} & b_{12} & b_{13} & b_{14} & a_{12} & b_{15} & b_{16} & b_{17} & b_{18} & a_{13} \\ a_{21} & b_{11} & b_{12} & b_{13} & b_{14} & a_{22} & b_{15} & b_{16} & b_{17} & b_{18} & a_{23} \\ a_{31} & b_{11} & b_{12} & b_{13} & b_{14} & a_{32} & b_{15} & b_{16} & b_{17} & b_{18} & a_{33} \end{bmatrix}.$$

Manner 2

The antenna array #2 includes array elements in P rows and Q columns, and P is an integer greater than or equal to 2. The L×N values may include the L×K received values received by the antenna array #1. Each group of values in the L×N values includes Q received values received by one row of array elements in the antenna array #2. In addition, Q received values that are included in each of at least two groups of values in the L×N values are received by a different row of array elements in the antenna array #2, respectively. In addition, an arrangement order of N elements (namely, K received values received by one row of array elements in the antenna array #1 and Q received values received by one row of array elements in the antenna array #2) included in each group of values divided from the L×N values is the same as an arrangement order of the receive array elements corresponding to each received value in the direction x.

In an implementation, the communication device may insert Q received values received by a $\lceil l/P \rceil^{th}$ row of array elements in the antenna array #2 into an $l^{th}$ group of received values of the antenna array #1 in an arrangement order of receive array elements in the direction x, to obtain an $l^{th}$ group of values in the L×N values. In other words, the Q received values that are received by the antenna array #2 and that are included in the $l^{th}$ group of values in the L×N values are the Q received values received by the $\lceil l/P \rceil^{th}$ row of array elements in the antenna array #2 and the $l^{th}$ group of received values of the antenna array #1, where l is any integer greater than 0 and less than or equal to L.

In another implementation, the communication device may insert Q received values received by a $\text{mod}(l,P)^{th}$ row of array elements in the antenna array #2 into an $l^{th}$ group of received values of the antenna array #1 in an arrangement order of receive array elements, to obtain an $l^{th}$ group of values in the L×N values. In other words, the Q received values that are received by the antenna array #2 and that are included in the $l^{th}$ group of values in the L×N values are the Q received values received by the $\text{mod}(l,P)^{th}$ row of array elements in the antenna array #2 and the $l^{th}$ group of received values of the antenna array #1, where $\text{mod}(l,P)$ represents a remainder of l/P, and l is any integer greater than 0 and less than or equal to L.

In another implementation, Q received values that are received by the antenna array #2 and that are included in an $l^{th}$ group of values in the L×N values may be Q received values received by a predefined row of array elements in the antenna array #2. In other words, a predefined group of received values of the antenna array #1 corresponds to a predefined group of received values of the antenna array #2. The communication device inserts a group of received values of the antenna array #2 corresponding to an $l^{th}$ group of received values of the antenna array #1 into the $l^{th}$ group of received values of the antenna array #1 in an arrangement order of receive array elements.

For example, as shown in example c in FIG. 6, the antenna array #1 includes three rows and three columns, in other words, L=3, and K=3. Nine received values are obtained by receiving the first signal and are divided into three groups of values. Each group of values includes three received values received by a same row of array elements. The antenna array #2 includes array elements in two rows and eight columns, in other words, P=2, and Q=8. Sixteen received values are obtained by receiving the first signal, and the communication device divides the sixteen received values into two groups of received values based on rows of array elements. Each group of received values includes eight received values received by a same row of array elements. The communication device determines L×N values for measuring the AoA of the first signal, in other words, 3×11, 33 values. The 33 values are divided into three groups of values. Eight received values that are included in each of at least two groups of values and that are received by the antenna array #2 are eight received values received by a different row of array elements in the antenna array #2, respectively.

In an implementation, Q received values that are received by the antenna array #2 and that are included in an $l^{th}$ group of values in the L×N values are Q received values received by a $\lceil l/P \rceil^{th}$ row of array elements in the antenna array #2. The communication device inserts a $\lceil 1/2 \rceil^{th}$ group (namely, a first group) of received values $b_{11}$ to $b_{18}$ of the antenna array #2, namely, eight received values $b_{11}$ to $b_{18}$ received by a $\lceil 1/2 \rceil^{th}$ row (namely, a first row) of array elements, into a first group of received values of the antenna array #1 in an arrangement order of receive array elements, to determine a first group of values in the L×N values, namely, the 33 values. In addition, the communication device inserts a $\lceil 2/2 \rceil^{th}$ group (namely, a first group) of received values $b_{11}$ to $b_{18}$ of the antenna array #2 into a second group of received values of the antenna array #1 in an arrangement order of antennas, to determine a second group of values in the 33 values, and inserts a $\lceil 3/2 \rceil^{th}$ group (namely, a second group) of received values $b_{21}$ to $b_{28}$ of the antenna array #2 into a second group of received values of the antenna array #1 in an arrangement order of antennas, to determine a third group of values in the 33 values. In this case, in the 33 values determined by the communication device, the first group of values includes the first group of three received values in the received values of the antenna array #1, and further includes the eight received values $b_{11}$ to $b_{18}$ received by the $\lceil 1/2 \rceil^{th}$ row (namely, the first row) of array elements in the antenna array #2. The second group of values in the 33 values includes the second group of values in the received values of the antenna array #1, and further includes the eight received values $b_{11}$ to $b_{18}$ received by the $\lceil 2/2 \rceil^{th}$ row (namely, the first row) of array elements in the antenna array #2. The third group of values in the 33 values includes the third group of values in the received values of the antenna array #1, and further includes the eight received values $b_{21}$ to $b_{28}$ received by the $\lceil 3/2 \rceil^{th}$ row (namely, the second row) of array elements in the antenna array #2. In other words, in the three groups of values divided from the 33 values by the communication device, the first P groups (namely, the first two groups) each include the eight received values $b_{11}$ to $b_{18}$ received by the first row of array elements in the antenna array #2, and the last group includes the eight received values $b_{21}$ to $b_{28}$ received by the second row of array elements in the antenna array #2. In addition, an arrangement order of received values in each group of values is the same as an arrangement order of corresponding receiving antennas in the direction x. Using the third group of values as an example, an arrangement order of the received values is $a_{31}$, $b_{21}$, $b_{22}$, $b_{23}$, $b_{24}$, $a_{32}$, $b_{25}$, $b_{26}$, $b_{27}$, $b_{28}$, and $a_{33}$.

If a manner of generating a matrix is used for implementation, a matrix A and a matrix B are:

$$A = \begin{bmatrix} a_{11} & a_{12} & a_{13} \\ a_{21} & a_{22} & a_{23} \\ a_{31} & a_{32} & a_{33} \end{bmatrix} \text{ and } B = \begin{bmatrix} b_{11} & b_{12} & b_{13} & b_{14} & b_{15} & b_{16} & b_{17} & b_{18} \\ b_{21} & b_{22} & b_{23} & b_{24} & b_{25} & b_{26} & b_{27} & b_{28} \end{bmatrix},$$

the communication device inserts the first row of the matrix B into the first row and the second row of the matrix A based on an order of array elements corresponding to the received values, and inserts the second row of the matrix B into the third row of the matrix A based on an order of array elements corresponding to the received values, to obtain a matrix C including the 33 values as follows:

$$C = \begin{bmatrix} a_{11} & b_{11} & b_{12} & b_{13} & b_{14} & a_{12} & b_{15} & b_{16} & b_{17} & b_{18} & a_{13} \\ a_{21} & b_{11} & b_{12} & b_{13} & b_{14} & a_{22} & b_{15} & b_{16} & b_{17} & b_{18} & a_{23} \\ a_{31} & b_{21} & b_{22} & b_{23} & b_{24} & a_{32} & b_{25} & b_{26} & b_{27} & b_{28} & a_{33} \end{bmatrix}.$$

In another implementation, Q received values that are received by the antenna array #2 and that are included in an $l^{th}$ group of values in the L×N values are Q received values received by a $\mathrm{mod}(l,P)^{th}$ row of array elements in the antenna array #2. The communication device inserts a $\mathrm{mod}(1,2)^{th}$ group (namely, a first group) of received values $b_{11}$ to $b_{18}$ of the antenna array #2, namely, eight received values $b_{11}$ to $b_{18}$ received by a $\lceil 1/2 \rceil^{th}$ row (namely, a first row) of array elements, into a first group of received values of the antenna array #1 in an arrangement order of receive array elements, to determine a first group of values in the L×N values, namely, the 33 values. In addition, the communication device inserts a $\mathrm{mod}(2,2)^{th}$ group (namely, a second group) of received values $b_{21}$ to $b_{28}$ of the antenna array #2 into a second group of received values of the antenna array #1 in an arrangement order of antennas, to determine a second group of values in the 33 values, and inserts a $\mathrm{mod}(3,2)^{th}$ group (namely, a first group) of received values $b_{11}$ to $b_{18}$ of the antenna array #2 into a second group of received values of the antenna array #1 in an arrangement order of antennas, to determine a third group of values in the 33 values. In this case, the eight values that are received by the antenna array #2 and that are included in the first group of values in the 33 values determined by the communication device are the eight received values received by the $\mathrm{mod}(1,2)^{th}$ row (namely, the first row) of array elements in the antenna array #2. The second group of values includes the eight received values received by the $\mathrm{mod}(2,2)^{th}$ row (namely, the second row) of array elements in the antenna array #2. The third group of values includes the eight received values received by the $\mathrm{mod}(3,2)^{th}$ row (namely, the first row) of array elements in the antenna array #2. In addition, an arrangement order of received values in each group of values is the same as an arrangement order of corresponding receiving antennas in the direction x. Using the third group of values as an example, an arrangement order of the received values is $a_{31}$, $b_{11}$, $b_{12}$, $b_{13}$, $b_{14}$, $a_{32}$, $b_{15}$, $b_{16}$, $b_{17}$, $b_{18}$, and $a_{33}$.

If a manner of generating a matrix is used for implementation, the communication device inserts the first row of the matrix B into the first row and the third row of the matrix A based on an order of array elements corresponding to the received values, and inserts the second row of the matrix B into the second row of the matrix A based on an order of array elements corresponding to the received values. In this case, a matrix C including the 33 values is as follows:

$$C = \begin{bmatrix} a_{11} & b_{11} & b_{12} & b_{13} & b_{14} & a_{12} & b_{15} & b_{16} & b_{17} & b_{18} & a_{13} \\ a_{21} & b_{21} & b_{22} & b_{23} & b_{24} & a_{22} & b_{25} & b_{26} & b_{27} & b_{28} & a_{23} \\ a_{31} & b_{11} & b_{12} & b_{13} & b_{14} & a_{32} & b_{15} & b_{16} & b_{17} & b_{18} & a_{33} \end{bmatrix}.$$

Manner 3

The antenna array #2 includes array elements in P rows and Q columns, and P is an integer less than or equal to 2. The L×N values include L×K received values received by the antenna array #1 and values determined based on P×Q received values of the antenna array #2. Each group of L groups of values divided from the L×N values includes Q values that are determined by the communication device based on the P×Q received values of the antenna array #2.

As an example but not a limitation, the values determined based on the P×Q received values of the antenna array #2 are Q values obtained by the communication device by performing a mean operation on received values of each column of array elements in the antenna array #2. The mean operation may be arithmetic averaging or weighted averaging. In addition, summation may also be an equivalent replacement of the mean operation.

For example, as shown in example b in FIG. 6, array elements in two rows and four columns in the antenna array #2 receive eight received values. The communication device performs arithmetic averaging on the received values of each column of array elements in the antenna array #2. In this case, an arithmetic average value of P received values $b_{1q}$ to $b_{Pq}$ of a $q^{th}$ column of array elements is $(b_{1q}+b_{2q}+\ldots+b_{pq}+\ldots+b_{Pq})/P$. In this case, the communication device may obtain four values $(b_{11}+b_{21})/2$, $(b_{12}+b_{22})/2$, $(b_{13}+b_{23})/2$, and $(b_{14}+b_{24})/2$ by performing arithmetic averaging on the received values of each column of array elements in the antenna array #2 shown in example b in FIG. 6. The communication device inserts the four values into each group of values of the antenna array #1 in an arrangement order of columns of array elements respectively corresponding to the four values in the direction x, to determine L×N values (that is, 3×8, 24 values). Each group of three groups of values divided from the 24 values by the communication device includes $(b_{11}+b_{21})/2$, $(b_{12}+b_{22})/2$, $(b_{13}+b_{23})/2$, and $(b_{14}+b_{24})/2$ that are determined based on the received values of the antenna array #2.

When generating a matrix, after performing arithmetic averaging on each column of a matrix B, the communication device inserts Q values obtained after the averaging into a matrix A in an arrangement order of columns of array elements, and a matrix C that includes the L×N values (that is, 3×8, 24 values) and that is determined based on the received values of the antenna array #1 and the antenna array #2 shown in the example in FIG. 6 is as follows:

$$C = \begin{bmatrix} a_{11} & (b_{11}+b_{21})/2 & (b_{12}+b_{22})/2 & a_{12} & a_{13} & (b_{13}+b_{23})/2 & (b_{14}+b_{24})/2 & a_{14} \\ a_{21} & (b_{11}+b_{21})/2 & (b_{12}+b_{22})/2 & a_{22} & a_{23} & (b_{13}+b_{23})/2 & (b_{14}+b_{24})/2 & a_{24} \\ a_{31} & (b_{11}+b_{21})/2 & (b_{12}+b_{22})/2 & a_{32} & a_{33} & (b_{13}+b_{23})/2 & (b_{14}+b_{24})/2 & a_{34} \end{bmatrix}.$$

For another example, as shown in example b in FIG. 6, if the communication device performs weighted averaging on the received values of each column of array elements in the antenna array #2, a weighted average value of P received values $b_{1q}$ to $b_{Pq}$ of a $q^{th}$ column of array elements is $(w_{1q}b_{1q}+w_{2q}b_{2q}+\ldots+w_{pq}b_{pq}+\ldots+w_{Pq}b_{Pq})/P$. In this case, four values $(w_{11}b_{11}+w_{21}b_{21})/2$, $(w_{12}b_{12}+w_{22}b_{22})/2$, $(w_{13}b_{13}+w_{23}b_{23})/2$, and $(w_{14}b_{14}+w_{14}b_{24})/2$ may be obtained by performing arithmetic averaging on the received values of each column of array elements in the antenna array #2 shown in example b in FIG. 6. The communication device inserts the four values into each group of values of the antenna array #1 in an arrangement order of columns of array elements respectively corresponding to the four values in the direction x, to determine L×N values (that is, 3×8, 24 values). In this case, each group of three groups of values divided from the 24 values by the communication device includes $(w_{11}b_{11}+w_{21}b_{21})/2$, $(w_{12}b_{12}+w_{22}b_{22})/2$, $(w_{13}b_{13}+w_{23}b_{23})/2$, and $(w_{14}b_{14}+w_{14}b_{24})/2$ that are determined based on the received values of the antenna array #2.

When generating a matrix, after performing weighted averaging on each column of a matrix B to obtain Q values, the communication device inserts the Q values into a matrix A based on an arrangement order of columns of array elements, and a matrix C that includes the 24 values and that is determined in the received values of the antenna array #1 and the antenna array #2 shown in example b in FIG. 6 is as follows:

A weighted value $w_{pq}$ of each received value of the antenna array #2 may be predefined.

For another example, if the communication device performs summation on the received values of each column of array elements in the antenna array #2, a sum of P received values $b_{1q}$ to $b_{Pq}$ of a $q^{th}$ column of element is $b_{1q}+b_{2q}+\ldots+b_{pq}+\ldots+b_{Pq}$. In this case, the communication device may obtain four values $b_{11}+b_{21}$, $b_{12}+b_{22}$, $b_{13}+b_{23}$, and $b_{14}+b_{24}$ by performing arithmetic averaging on the received values of each column of array elements in the antenna array #2 shown in example b in FIG. 6, and insert the four values into each group of values of the antenna array #1 in an arrangement order of columns of array elements respectively corresponding to the four values in the direction x, to determine L×N values (that is, 3×8, 24 values). In this case, each group of three groups of values divided from the 24 values by the communication device includes $b_{11}+b_{21}$, $b_{12}+b_{22}$, $b_{13}+b_{23}$, and $b_{14}+b_{24}$ that are determined based on the received values of the antenna array #2.

When generating a matrix, after arithmetic averaging is performed on each column of a matrix B, Q values obtained after the averaging are inserted into a matrix A in an arrangement order of columns of array elements, and a matrix C that includes the 24 values and that is determined by the communication device based on the received values of the antenna array #1 and the antenna array #2 shown in example b in FIG. 6 is as follows:

$$C = \begin{bmatrix} a_{11} & b_{11}+b_{21} & b_{12}+b_{22} & a_{12} & a_{13} & b_{13}+b_{23} & b_{14}+b_{24} & a_{14} \\ a_{21} & b_{11}+b_{21} & b_{12}+b_{22} & a_{22} & a_{23} & b_{13}+b_{23} & b_{14}+b_{24} & a_{24} \\ a_{31} & b_{11}+b_{21} & b_{12}+b_{22} & a_{32} & a_{33} & b_{13}+b_{23} & b_{14}+b_{24} & a_{34} \end{bmatrix}.$$

S230: The communication device determines an AoA of the first signal based on the L×N values.

After determining the L×N values in S220, the communication device first estimates a component θ of an AoA(θ, φ) of the first signal based on the L×N values, namely, an included angle estimated value $\tilde{\theta}$ of a direction of arrival of the first signal and a direction x, and then determines an included angle estimated value $\tilde{\varphi}$ of the direction of arrival of the first signal and a direction y based on the included angle estimated value $\tilde{\theta}$. In other words, an estimated AoA ($\tilde{\theta}$, $\tilde{\varphi}$) of the AoA of the first signal is determined.

In an implementation, after sequentially arranging the L groups of values divided from the L×N values in a group order to form a vector (namely, a first vector) whose length is L×N, the communication device calculates an included angle estimated value $\tilde{\theta}$ of the direction of arrival of the first signal and the direction x based on the vector whose length is L×N. In other words, the communication device sequentially connects the N values in each group of the L groups $$C = \begin{bmatrix} a_{11} & (w_{11}b_{11}+w_{21}b_{21})/2 & (w_{12}b_{12}+w_{22}b_{22})/2 & a_{12} & a_{13} & (w_{13}b_{13}+w_{23}b_{23})/2 & (w_{14}b_{14}+w_{14}b_{24})/2 & a_{14} \\ a_{21} & (w_{11}b_{11}+w_{21}b_{21})/2 & (w_{12}b_{12}+w_{22}b_{22})/2 & a_{22} & a_{23} & (w_{13}b_{13}+w_{23}b_{23})/2 & (w_{14}b_{14}+w_{14}b_{24})/2 & a_{24} \\ a_{31} & (w_{11}b_{11}+w_{21}b_{21})/2 & (w_{12}b_{12}+w_{22}b_{22})/2 & a_{32} & a_{33} & (w_{13}b_{13}+w_{23}b_{23})/2 & (w_{14}b_{14}+w_{14}b_{24})/2 & a_{34} \end{bmatrix}.$$

of values in a head-to-tail manner in a group order to form the vector whose length is L×N. Alternatively, if the L×N values are an L×N-dimensional matrix C, the communication device sequentially connects each row of the matrix C head-to-tail to form a vector C' whose length is L×N.

For example, N values included in an $l^{th}$ group of values in the L×N values are $c_{l1}, c_{l2}, \ldots,$ and $c_{lN}$, and the communication device sequentially arranges each group of values in a group order to obtain a vector C' whose length is L×N as follows:

$$C'=[c_{11} c_{12} \ldots c_{1N} c_{l1} c_{l2} \ldots c_{lN} \ldots c_{L1} c_{L2} \ldots c_{LN}].$$

In another implementation, the communication device summates values in a same location in each group of the L groups of values in the L×N values to obtain a 1×N vector (namely, a second vector), and then calculates an included angle estimated value $\tilde{\theta}$ of the direction of arrival of the first signal and the direction x based on the vector whose length is 1×N. In other words, if the L×N values are an L×N-dimensional matrix C, the matrix C is summated by column to obtain the 1×N vector.

For example, N values included in an $l^{th}$ group of values in the L×N values are $c_{l1}, c_{l2}, \ldots,$ and $c_{lN}$, and the communication device summates values in a same location in each group of the L groups of values to obtain a 1×N vector C' as follows:

$$C'=[c_{11}+c_{21}+\ldots+c_{l1}\ldots+c_{L1}\ c_{12}+c_{22}+\ldots+c_{l2}+\ldots+c_{L2}\ldots c_{1N}+c_{2N}+\ldots+c_{lN}\ldots+c_{Ln}].$$

Thereafter, the communication device may determine the included angle estimated value $\tilde{\theta}$ based on a vector $\tilde{C}$. For example, the communication device may perform a fast Fourier transform (FFT) or digital beam forming (DBF) on the vector C' to obtain the included angle estimated value $\tilde{\theta}$. The included angle estimated value $\tilde{\theta}$ is the included angle estimated value $\tilde{\theta}$ of the direction of arrival of the first signal and the direction x (as shown in FIG. 4). Further, the communication device may perform DBF based on the included angle estimated value $\tilde{\theta}$ and the received values of the antenna array #1, to obtain the included angle estimated value $\tilde{\phi}$ of the direction of arrival of the first signal and the direction y. In other words, an estimated AoA $(\tilde{\theta}, \tilde{\phi})$ of the AoA of the first signal is determined. As an example but not a limitation, the direction x is a horizontal direction, and the direction y is a vertical direction; or the direction x is a vertical direction, and the direction y is a horizontal direction.

Figure 7:
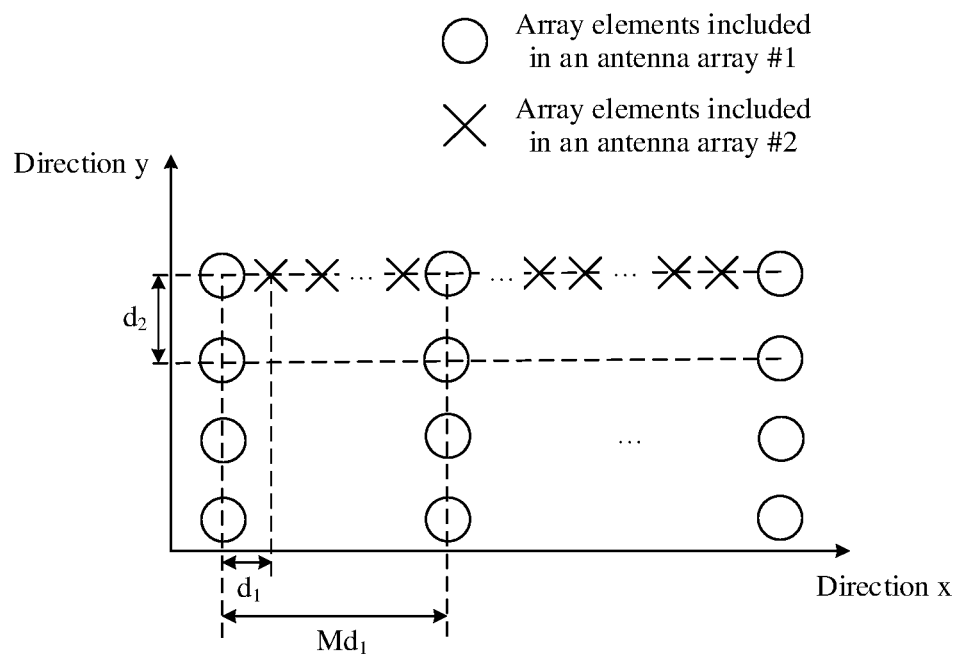
FIG. 7 is a schematic diagram of another example of an antenna array according to an embodiment.

For example, the antenna array shown in FIG. 7 includes L rows of array elements arranged in a direction y and N columns of array elements arranged in a direction x, and a spacing between two adjacent rows is $d_2$. The first row includes N array elements, and a spacing between two adjacent array elements is $d_1$. Each row of array elements other than the first row includes K array elements, and a spacing between two adjacent array elements in a same row is $Md_1$. The antenna array #1 and the antenna array #2 are two subarrays of the antenna array shown in FIG. 7. K columns of array elements including L array elements in each column form the antenna array #1, and Q columns of array elements including one array element in each column form the antenna array #2.

A vector x(t) generated by the communication device based on the received values of the antenna array may be denoted as:

$$x(t)=v(t)s(t)+n(t), \text{ where}$$

v(t) is a steering vector, n(t) is a noise vector, s(t) is a source signal (namely, the first signal), and s(t) is a single constant in a single snapshot condition. Therefore, a received value of the array may be understood as a linear sum of the steering vector. For ease of description, the steering vector is used to describe a processing process of the received value. Because each element in the steering vector corresponds to one received value, the meaning of using the steering vector is the same as that of directly using the received value.

A steering vector of a first row of N received values in the antenna array shown in FIG. 7 is:

$$v_1(\theta)=[1\ e^{-ju}\ e^{-j2u}\ldots e^{-j(M-1)u}\ e^{-jMu}\ldots e^{-j(2MK-)u}\ e^{-j2Mu}\ldots e^{-j(N-1)u}]^T,$$

where $u=(2\pi d_1/\lambda)\cos\theta$, $\lambda$ is a wavelength of the first signal, and a superscript T represents a transpose of a matrix.

A steering vector of Q received values of the antenna array #2 is:

$$v_{\#2}(\theta)=[e^{-ju}\ e^{-j2}a\ldots e^{-j(M-1)u}\ldots e^{-j(2M-1)u}\ldots]^T,$$

where that is, elements other than $e^{-j(k-1)Mu}$ in $v_1(\theta)$ form $v_{\#2}(\theta)$, where $0<k\leq K$, and k is an integer.

A steering vector of K received values of an $l^{th}$ row of array elements in the antenna array #1 is:

$$v_{\#1,l}(\theta,\phi)=e^{-j(l-1)w}[1\ e^{-jMu}\ e^{-j2Mu}\ldots e^{-j(K-1)Mu}]^T,$$

where $w=(2\pi d_2/\lambda)\cos\phi$, $0<l\leq L$, and i is an integer. The communication device determines L×N values in the foregoing manner 1. In this case, N elements in an $l^{th}$ group of values in the L×N values include elements in $v_{\#1,l}(\theta,\phi)$ (namely, elements in the steering vector of the received values of the $l^{th}$ row of array elements in the antenna array #1). Each group of values in the L×N values includes elements in $v_{\#2}(\theta)$ (namely, elements in the steering vector of the received values of the antenna array #2). In addition, an arrangement order of the elements is the same as an arrangement order of corresponding receive array elements in the direction x. In other words, the communication device inserts the elements in $v_{\#2}(\theta)$ into the steering vector of each row of array elements in the antenna array #1 in the arrangement order of the corresponding receive array elements, to obtain an $l^{th}$ group of values in the L×N values as follows:

$$v_{L\times N,l}(\theta,\phi)=e^{-j(l-1)w}[1\ e^{-ju}\ e^{-j2u}\ldots e^{-jMu}\ldots e^{-j(K-1)Mu}]^T.$$

The communication device sequentially arranges each group of values in the L×N values in an ascending order of a group number l, to obtain a vector C' whose length is L×N:

$$C'=[v_{L\times N,1}(\theta,\phi)\ v_{L\times N,2}(\theta,\phi)\ldots v_{L\times N,L}(\theta,\phi)]; \text{ or}$$

elements in a same location in each group of values in the L×N values are summated, to obtain a vector C whose length is N:

$$C'=v_{L\times N,1}(\theta,\phi)+v_{L\times N,2}(\theta,\phi)+v_{L\times N,L}(\theta,\phi).$$

Then, the communication device performs FFT or DBF on the vector C' to obtain an included angle estimated value $\tilde{\theta}$, substitutes the included angle estimated value $\tilde{\theta}$ into $v\#_{1,l}(\tilde{\theta},\phi)$ to obtain $v_{\#1,l}(\tilde{\theta},\phi)$, and then performs DBF to obtain an included angle estimated value $\tilde{\phi}$. In other words, an estimated AoA of the AoA of the first signal is determined.

For the sparsely arranged antenna array #1, the antenna array #2 may be additionally disposed, where a quantity of rows of array elements arranged in the direction y is less than a quantity of rows of array elements of the antenna array #1, and an array element location is different from an array element location of the antenna array #1 in the direction x. The antenna array #1 and the antenna array #2 jointly receive a signal, and values determined based on received values of the antenna array #2 are inserted into received values of each row of array elements in the antenna array #1, to add sampling values of the received signal in the direction x. This can resolve a problem of angle ambiguity occurring when an AoA of a received signal is measured, estimate the AoA of the received signal, and effectively expand a field of view of an antenna array. In addition, dense arrangement of each row of array elements in the antenna array #1 is avoided, and engineering implementation is easy. Especially, a large-scale antenna array can reduce material overheads and costs of array elements on the basis of resolving a problem of angle ambiguity of an AoA.

The methods provided in the embodiments are described above in detail with reference to FIG. 2 to FIG. 7. The apparatuses provided in the embodiments are described below in detail with reference to FIG. 8 and FIG. 9.

Figure 8:
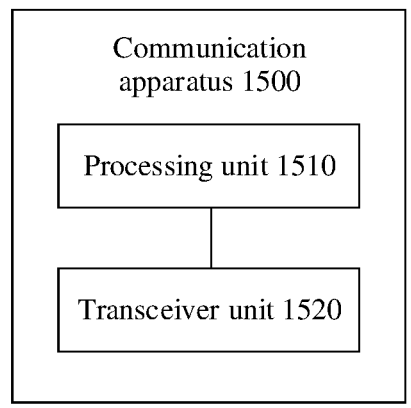
FIG. 8 is a schematic block diagram of an example of an apparatus applicable to an embodiment.

FIG. 8 is a schematic block diagram of a communication apparatus according to an embodiment. As shown in FIG. 8, the communication apparatus 1500 may include a processing unit 1510 and a transceiver unit 1520.

The communication apparatus 1500 may correspond to the communication device that performs the foregoing method embodiments, for example, may be the communication device or a chip configured in the communication device.

It should be understood that the communication apparatus 1500 may correspond to the communication device that performs the method 200 in the embodiments, and the communication apparatus 1500 may include units of the communication device that is configured to perform the method 200 in FIG. 2. In addition, the units in the communication apparatus 1500 and the foregoing other operations and/or functions are respectively used to implement corresponding procedures of the method 200 in FIG. 2.

When the communication apparatus 1500 is configured to perform the method 200 in FIG. 2, the transceiver unit 1520 may include the antenna array #1 and the antenna array #2 in this solution and may be configured to perform S210 in the method 200, and the processing unit 1510 may be configured to perform S220 and S230 in the method 200. It should be understood that a process of performing a corresponding step by each unit has been described in detail in the foregoing method embodiments. For brevity, details are not described herein again.

Figure 9:
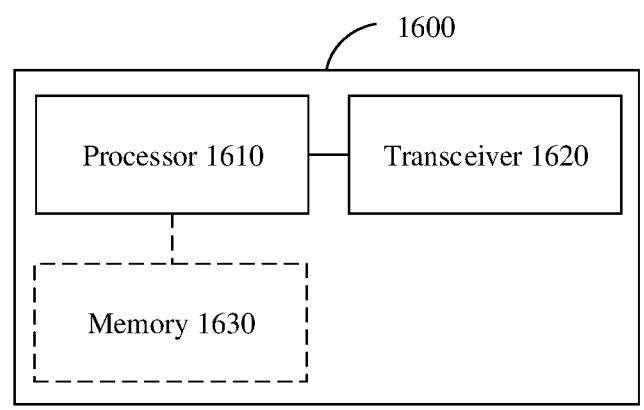
FIG. 9 is a schematic diagram of an example of a structure of a device applicable to an embodiment.

It should be further understood that, when the communication apparatus 1500 is a communication device, the transceiver unit 1520 in the communication apparatus 1500 may correspond to a transceiver 1620 in a communication device 1600 shown in FIG. 9, and the processing unit 1510 in the communication apparatus 1500 may correspond to a processor 1610 in the communication device 1600 shown in FIG. 9.

It should be further understood that, when the communication apparatus 1500 is a communication device, the transceiver unit 1520 in the communication apparatus 1500 may be implemented by using a communication interface (for example, a transceiver or an input/output interface), for example, may correspond to the transceiver 1620 in the communication device 1600 shown in FIG. 8. The processing unit 1510 in the communication apparatus 1500 may be implemented by using at least one processor, for example, may correspond to the processor 1610 in the communication device 1600 shown in FIG. 9. Alternatively, the processing unit 1510 in the communication apparatus 1500 may be implemented by using at least one logical circuit.

Optionally, the communication apparatus 1500 may further include a processing unit 1510. The processing unit 1510 may be configured to process instructions or data, to implement a corresponding operation.

Optionally, the communication apparatus 1500 may further include a storage unit. The storage unit may be configured to store instructions or data. The processing unit may invoke the instructions or the data stored in the storage unit, to implement a corresponding operation.

It should be understood that a process of performing a corresponding step by each unit has been described in detail in the foregoing method embodiments. For brevity, details are not described herein again.

FIG. 9 is a schematic diagram of a structure of a communication device 1600 according to an embodiment. The communication device 1600 may be applied to one or more of the device 101 to the device 105 in the system shown in FIG. 1, to perform a function of the communication device in the foregoing method embodiment. As shown in the figure, the communication device 1600 includes a processor 1610 and a transceiver 1620. Optionally, the communication device 1600 further includes a memory 1630. The processor 1610, the transceiver 1620, and the memory 1630 may communicate with each other through an internal connection path, to transfer a control signal and/or a data signal. The memory 1630 is configured to store a computer program. The processor 1610 is configured to: invoke the computer program from the memory 1630 and run the computer program, to control the transceiver 1620 to receive and send a signal. The transceiver 1620 of the communication device 1600 further includes an antenna array #1 and an antenna array #2, configured to receive a radio signal.

The processor 1610 and the memory 1630 may be integrated into one processing apparatus. The processor 1610 is configured to execute program code stored in the memory 1630 to implement the foregoing functions. During implementation, the memory 1630 may alternatively be integrated into the processor 1610 or may be independent of the processor 1610. The processor 1610 may correspond to the processing unit in FIG. 8.

The transceiver 1620 may correspond to the transceiver unit in FIG. 8. The transceiver 1620 may include a receiver and a transmitter. The receiver is configured to receive a signal and the transmitter is configured to transmit a signal. The receiver includes the antenna array #1 and the antenna array #2 in this solution.

It should be understood that the communication device 1600 shown in FIG. 9 can implement the processes in the method embodiment shown in FIG. 2. The operations and/or the functions of the modules in the communication device 1600 are intended to implement corresponding procedures in the foregoing method embodiments. For details, refer to the descriptions in the foregoing method embodiments. To avoid repetition, detailed descriptions are properly omitted herein.

The processor 1610 may be configured to perform an action that is implemented inside the communication device and that is described in the foregoing method embodiment, and the transceiver 1620 may be configured to perform an action that is of receiving the first signal by the communication device and that is described in the foregoing method embodiment. For details, refer to the descriptions in the foregoing method embodiments. Details are not described herein.

An embodiment further provides a processing apparatus, including a processor and an interface. The processor is configured to perform the method in any one of the foregoing method embodiments.

It should be understood that the processing apparatus may be one or more chips. For example, the processing apparatus may be a field programmable gate array (FPGA), an application-specific integrated circuit (ASIC), a system on chip (SoC), a central processing unit (CPU), a network processor (NP), a digital signal processing circuit (DSP), a micro controller (MCU), a programmable logic device (PLD), or another integrated chip.

In an implementation process, steps in the foregoing methods can be implemented by using a hardware integrated logical circuit in the processor, or by using instructions in a form of software. The steps of the method may be directly performed and completed by a hardware processor or may be performed and completed by using a combination of hardware and software modules in the processor. The software module may be located in a storage medium mature in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor. To avoid repetition, details are not described herein again.

It should be noted that the processor in the embodiments may be an integrated circuit chip and has a signal processing capability. In an implementation process, the steps in the foregoing method embodiments can be implemented by a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams in the embodiments. The general-purpose processor may be a microprocessor, or the processor may be any conventional processor, or the like. The steps of the methods with reference to the embodiments may be directly performed and completed by a hardware decoding processor or may be performed and completed by using a combination of hardware and software modules in the decoding processor. The software module may be located in a storage medium mature in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments may be a volatile memory or a non-volatile memory or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory in the system and the method is intended to include, but not limited to, these memories and any memory of another proper type.

According to the methods provided in the embodiments, a computer program product includes computer program code. When the computer program code is run on a computer, the computer is enabled to perform the method in the embodiment shown in FIG. 2.

According to the methods provided in the embodiments a computer-readable medium stores program code. When the program code is run on a computer, the computer is enabled to perform the method in the embodiment shown in FIG. 2.

According to the methods provided in the embodiments a system includes the one or more terminal devices and the one or more network devices.

The communication device in the apparatus embodiments corresponds to the communication device in the method embodiments. A corresponding module or unit performs a corresponding step. For example, a communication unit (a transceiver) performs a receiving step or a sending step in the method embodiments, and a processing unit (a processor) may perform another step other than the sending step and the receiving step. For a function of a unit, refer to a corresponding method embodiment. There may be one or more processors.

All or a part of the foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer instructions are loaded and executed on a computer, all or some of the procedures or functions according to the embodiments are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The communication device in the foregoing apparatus embodiments corresponds to the communication device in the method embodiments. A corresponding module or unit performs a corresponding step. For example, a communication unit (a transceiver) performs a receiving step or a sending step in the method embodiments, and a processing unit (a processor) may perform another step other than the sending step and the receiving step. For a function of a unit, refer to a corresponding method embodiment. There may be one or more processors.

Terms such as "component", "module", and "system" are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and constraint conditions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objective of the embodiments.

In addition, functional units in the embodiments may be integrated into one processing unit, each of the units may exist alone physically, or two or more units may be integrated into one unit.

In the foregoing embodiments, all or a part of functions of functional units may be implemented by using software, hardware, firmware, or any combination thereof. When the software is used to implement embodiments, all or a part of embodiments may be implemented in a form of a computer program product. The computer program product includes one or more computer instructions (programs). When the computer program instructions (programs) are loaded and executed on a computer, all or some of the procedures or functions according to the embodiments are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software functional unit and sold or used as an independent product, the functions may be stored in a computer-readable storage medium. Based on such an understanding, the embodiments essentially, or the part contributing to the conventional technology, or some of the embodiments may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes various media that can store program code, such as a USB flash drive, a removable hard disk, a read-only memory (ROM), a random access memory (RAM), a magnetic disk, or an optical disc.

The foregoing descriptions are merely implementations, but are not intended to limit the scope of the embodiments. Any variation or replacement readily figured out by a person skilled in the art shall fall within the scope of the embodiments.

The invention claimed is:

1. A method for measuring an angle of arrival (AoA), comprising:
receiving a first signal by using a first antenna array and a second antenna array;
determining L×N values based on received values obtained by the first antenna array and the second antenna array by receiving the first signal, wherein the first antenna array comprises L rows of array elements arranged in a first direction and K columns of array elements arranged in a second direction, and the second antenna array comprises P rows of array elements arranged in the first direction and Q columns of array elements arranged in the second direction; N=K+Q, P<L, L, K, P, and Q are all positive integers; the L×N values comprise received values obtained by each array element in the first antenna array by receiving the first signal, and values determined based on received values obtained by the Q columns of array elements in the second antenna array by receiving the first signal; and an included angle greater than 0 degrees exists between the first direction and the second direction; and determining an AoA of the first signal based on the L×N values, wherein the L×N values are divided into L groups of values, each group of values comprises N elements, N elements in an $l^{th}$ group of values comprise K received values obtained by an $l^{th}$ row of array elements in the first antenna array by receiving the first signal, and Q values determined based on the received values obtained by the Q columns of array elements in the second antenna array by receiving the first signal, an arrangement order of the N elements is the same as an arrangement order of the K columns of array elements in the first antenna array and the Q columns of array elements in the second antenna array in the second direction, and l is any integer from 1 to L.

2. The method according to claim 1, further comprising:
generating, based on the L×N values, a matrix whose dimension is L×N, wherein one row of elements in the matrix is a group of values in the L groups of values; and determining the AoA of the first signal based on the L×N values further comprises:
determining the AoA based on the matrix.

3. The method according to claim 1, further comprising:
generating, based on the L×N values, a first vector whose length is L×N, wherein the L groups of values in the first vector are sequentially arranged; and
determining the AoA of the first signal based on the L×N received values further comprises:
determining the AoA based on the first vector.

4. The method according to claim 1, wherein the Q values comprised in the $l^{th}$ group of values are Q received values received by a predefined row of array elements in the Q columns of array elements.

5. The method according to claim 1, wherein Q values that are comprised in each of at least two groups of values in the L groups of values and that are determined based on the received values of the Q columns of array elements are Q received values received by different rows of array elements in the Q columns of array elements, respectively.

6. The method according to claim 1, wherein the Q values comprised in any group of the L groups of values are Q values obtained by performing a mean operation on received values of each column of the Q columns of array elements.

7. The method according to claim 1, wherein determining the AoA of the first signal based on the L×N values further comprises:
generating, based on the L×N values, a second vector whose length is 1×N; and
determining the AoA based on the second vector, wherein the second vector comprises K values obtained by summating received values of each column of array elements in the first antenna array, and the second vector further comprises:
Q values obtained by summating L values determined based on one or more of P received values received by each column of the Q columns of array elements, or
Q values determined based on a multiple of a mean value of P received values received by each column of the Q columns of array elements, wherein the multiple equals the mean value multiplied by L.

8. The method according to claim 1, wherein the AoA is obtained through FFT or DBF based on the L×N values.

9. The method according to claim 1, wherein the first antenna array or the second antenna array or both are virtual antenna arrays.

10. The method according to claim 1, wherein the AoA comprises an included angle between a direction of arrival of the first signal and the first direction and an included angle between the incoming direction of the first signal and the second direction.

11. An apparatus for measuring an angle of arrival (AoA), comprising:
a transceiver, configured to receive a first signal by using a first antenna array and a second antenna array; and
a processor, configured to determine L×N values based on received values obtained by the first antenna array and the second antenna array by receiving the first signal, wherein the first antenna array comprises L rows of array elements arranged in a first direction and K columns of array elements arranged in a second direction, and the second antenna array comprises P rows of array elements arranged in the first direction and Q columns of array elements arranged in the second direction; N=K+Q, P<L, L, K, P, and Q are all positive integers; the L×N values comprise received values obtained by each array element in the first antenna array by receiving the first signal, and values determined based on received values obtained by the Q columns of array elements in the second antenna array by receiving the first signal; and an included angle greater than 0 degrees exists between the first direction and the second direction; and
the processor is further configured to determine an AoA of the first signal based on the L×N values,
wherein the L×N values are divided into L groups of values, each group of values comprises N elements, N elements in an $l^{th}$ group of values comprise K received values obtained by an $l^{th}$ row of array elements in the first antenna array by receiving the first signal, and Q values determined based on the received values obtained by the Q columns of array elements in the second antenna array by receiving the first signal, an arrangement order of the N elements is the same as an arrangement order of the K columns of array elements in the first antenna array and the Q columns of array elements in the second antenna array in the second direction, and l is any integer from 1 to L.

12. The apparatus according to claim 11, wherein
the processor is further configured to generate, based on the L×N values, a matrix whose dimension is L×N, wherein one row of elements in the matrix is a group of values in the L groups of values; and determine the AoA based on the matrix.

13. The apparatus according to claim 11, wherein
the processor is further configured to generate, based on the L×N values, a first vector whose length is L×N, wherein the L groups of values in the first vector are sequentially arranged; and
determine the AoA based on the first vector.

14. The apparatus according to claim 11, wherein the Q values comprised in the $l^{th}$ group of values are Q received values received by a predefined row of array elements in the Q columns of array elements.

15. The apparatus according to claim 11, wherein Q values that are comprised in each of at least two groups of values in the L groups of values and that are determined based on the received values of the Q columns of array elements are Q received values received by different rows of array elements in the Q columns of array elements, respectively.

16. The apparatus according to claim 11, wherein the Q values comprised in any group of the L groups of values are Q values obtained by performing a mean operation on received values of each column of the Q columns of array elements.

17. The apparatus according to claim 11, wherein the processor is further configured to determine an AoA of the first signal based on the L×N values,
generate, based on the L×N values, a second vector whose length is 1×N, and
determine the AoA based on the second vector, wherein the second vector comprises K values obtained by summating received values of each column of array elements in the first antenna array, and the second vector further comprises:
Q values obtained by summating L values determined based on one or more of P received values received by each column of the Q columns of array elements, or
Q values determined based on a multiple of a mean value of P received values received by each column of the Q columns of array elements, wherein the multiple equals the mean value multiplied by L.

18. A non-transitory computer readable medium, wherein the non-transitory computer readable medium stores program instructions, and when the program instructions are executed by a computer system, cause the computer system to perform operations comprising:
receiving a first signal by using a first antenna array and a second antenna array;
determining L×N values based on received values obtained by the first antenna array and the second antenna array by receiving the first signal, wherein the first antenna array comprises L rows of array elements arranged in a first direction and K columns of array elements arranged in a second direction, and the second antenna array comprises P rows of array elements arranged in the first direction and Q columns of array elements arranged in the second direction; $N=K+Q$, $P<L$, L, K, P, and Q are all positive integers; the L×N values comprise received values obtained by each array element in the first antenna array by receiving the first signal, and values determined based on received values obtained by the Q columns of array elements in the second antenna array by receiving the first signal; and an included angle greater than 0 degrees exists between the first direction and the second direction; and
determining an AoA of the first signal based on the L×N values,
wherein the L×N values are divided into L groups of values, each group of values comprises N elements, N elements in an $l^{th}$ group of values comprise K received values obtained by an $l^{th}$ row of array elements in the first antenna array by receiving the first signal, and Q values determined based on the received values obtained by the Q columns of array elements in the second antenna array by receiving the first signal, an arrangement order of the N elements is the same as an arrangement order of the K columns of array elements in the first antenna array and the Q columns of array elements in the second antenna array in the second direction, and l is any integer from 1 to L.

* * * * *